Sept. 27, 1960 F. F. OFFNER 2,954,529

ARRANGEMENT FOR INHIBITING DRIFT IN AMPLIFIERS

Original Filed Feb. 9, 1951

INVENTOR
Franklin F. Offner
BY Pierce, Scheffler & Parker
ATTORNEYS

United States Patent Office 2,954,529

Patented Sept. 27, 1960

2,954,529

ARRANGEMENT FOR INHIBITING DRIFT IN AMPLIFIERS

Franklin F. Offner, % Offner Electronics Inc., 5320 N. Kedzie Ave., Chicago 25, Ill.

Continuation of application Ser. No. 210,204, Feb. 9, 1951. This application June 4, 1956, Ser. No. 589,322

2 Claims. (Cl. 330—9)

This invention relates to amplifiers of the vacuum tube type, and particularly to amplifiers for direct current signals. In the past, such amplifiers have had the defect of drifting due to random changes in the vacuum tubes, as well as in the power supply and other components of the amplifiers. One purpose of the present invention is to greatly diminish the effect of such drifting tendencies. This application is a continuation of my application Serial No. 210,204, filed February 9, 1951, now abandoned.

Another purpose of the invention is to provide an amplifier of the alternating current type, having improved amplifier characteristics.

Yet another and more specific purpose of the invention is to provide an arrangement for inhibiting amplifier drift by a periodic rebalancing action through inverse feedback. The feedback or rebalancing voltage is applied at a control point other than the input grid circuit which not only allows the input to be connected to the amplifier in the usual manner but also makes it possible to employ differential input and to operate with a portion of the signal source grounded.

Figure 1:
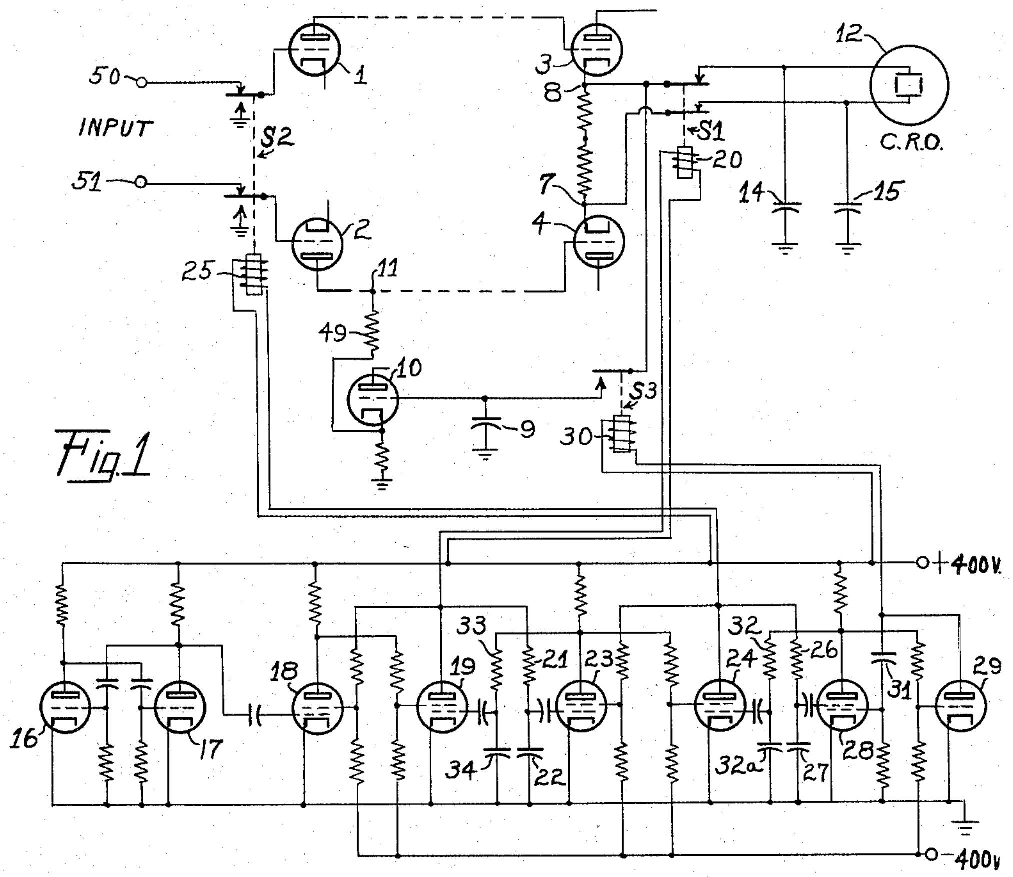
Figure 2:
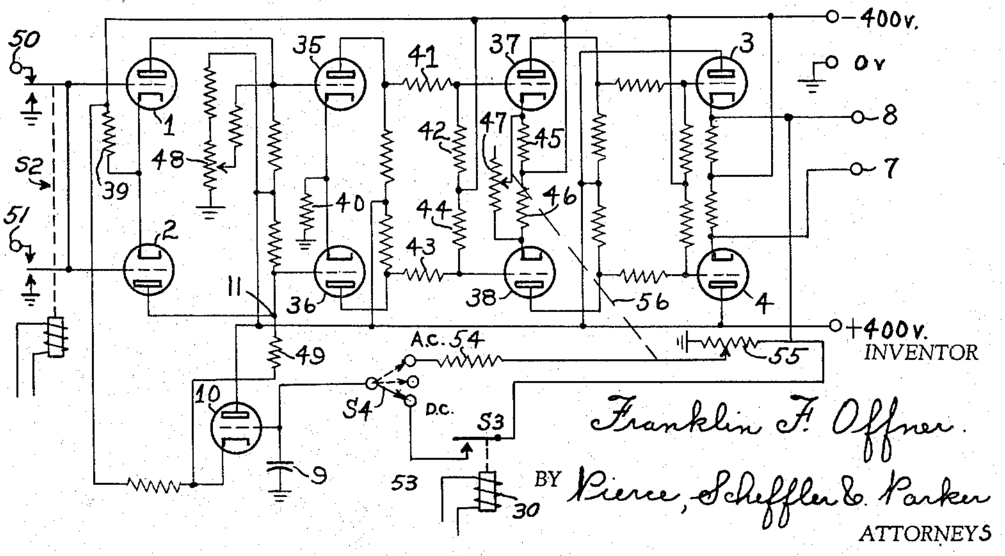

In the drawings, Fig. 1 is a schematic electrical circuit diagram illustrating one practical embodiment of the invention; and Fig. 2 is also an electrical schematic layout showing circuit details for a portion of the circuit shown in Fig. 1 as slightly modified.

With reference to the drawings, the basic principle of the invention is illustrated in the upper portion of Fig. 1. Here, 1 and 2 represent the input vacuum tubes of a differential push-pull amplifier; 3 and 4 represent the output tubes, which are shown as cathode-follower type. The interconnecting circuit between the input and output tubes is not shown here for the sake of simplifying illustration of the inventive concept but is however illustrated in Fig. 2.

As a result of spontaneous fluctuations in vacuum tubes 1 and 2, the voltage appearing at the output terminals of the amplifier will in general fluctuate in a random manner, and in general very large drifts in the output voltage will occur over a period of time. The slow drifts are in general of very large magnitude, and will tend to obscure any small, slow changes in the input applied to the amplifier.

Since the signal applied to the input of the amplifier will, in the general case, fluctuate in an unknown manner, it is impossible to distinguish the fluctuations in the output voltage due to the signal, from those due to spontaneous fluctuations within the amplifier. However, if the input signal is disconnected from the amplifier, and the two input grids of tubes 1 and 2 are connected to ground, then the output of the amplifier should be zero; and any deviation of the output from zero represents a spontaneous fluctuation within the amplifier.

In the present invention, this departure from zero output is detected and corrected through the action of switches S2 and S3. When switch S2 is in the up position, the input signal voltages at terminals 50 and 51 are connected to the input grids of tubes 1 and 2 respectively of the amplifier. However, when it moves into the downward position, the input grids are disconnected from the signal input terminals 50, 51 and are grounded. Any drifting of the amplifier will then show in the output by a departure in the voltage output terminal 7 from zero. This voltage is applied to condenser 9 by the closure of switch S3; and thus to the grid of vacuum tube 10. The voltage thus applied is amplified, and applied back at a point in the amplifier, point 11, which is in such phase as to reduce the amplification of the amplifier to a low value through the action of inverse feedback.

It will be seen that in the preferred form of the invention, as illustrated in Figure 1, the point 11 to which the rebalancing voltage is applied, is not connected to the input grid circuit of either input tube 1 and 2 but rather is connected into the amplifier at a point following the grid circuits of these tubes. This is a desirable feature, since it allows the input to be connected to the amplifier in the usual manner. If the rebalancing voltage were to be inserted in series with the input voltage directly; i.e. in the grid circuit, it would not be readily possible to employ differential input; nor to have any portion of the source grounded. Thus the preferred form of the invention is essential for most applications.

Thus when switch S3 is closed, the output voltage is applied into the amplifier in such a manner as to reduce the deviation of the output from zero; and by making the gain of this loop path sufficiently large, the deviation remaining may be made as small as desired. Thus, while switch S3 is closed, the amplifier is held as nearly at the balanced condition as may be desired.

The function of condenser 9 is the following: after an instant, switch S3 again opens. Condenser 9 holds the voltage which last appeared at the grid of vacuum tube 10 on the grid of this tube. Thus the unbalance which had existed in the amplifier prior to the closure of switch S3, remains effectively cancelled out. After switch S3 opens, switch S2 returns to the up position, re-connecting the input signal to the amplifier, and the amplifier may continue to function in the normal manner.

By causing this cycle of operation: grounding of the amplifier input by closure of switch S2 to ground, momentary closure of switch S3, and returning of the amplifier input terminals to the input signal, to occur as often as may be required, the deviation of the amplifier from the balanced condition may be kept as small as may be required.

It will be noted that during this rebalancing cycle the output voltage of the amplifier always returns to zero, or nearly so. However, there may be a rather large, steady signal applied to the amplifier input, which for example is being made visible on a cathode-ray oscillograph 12. Then, during the rebalancing cycle, this signal would drop to zero, returning to its correct value at the close of the cycle. In some applications this could confuse the observation. In order to eliminate this momentary surge in the recorded signal, switch S1 is provided. At the start of each rebalancing cycle, switch S1 opens, disconnecting the cathode-ray oscillograph, or other signal visualizing or recording means, from the amplifier. Condensers 14 and 15 are provided across the input terminals to the oscillograph. Then when switch S1 opens, the potential which was applied to the oscillograph at the instant of opening, remains so applied through the storage action of these condensers. The deflection of the oscillograph thus remains substantially constant during the rebalancing cycle, but when switch S1 recloses at the end of the cycle, the oscillograph is returned directly to the amplifier output terminals, and because of the low amplifier output impedance, condensers 14 and 15 have substantially no effect on the appearance of the output signal.

Thus the rebalancing cycle becomes the following: switch S1 opens; switch S2 grounds the amplifier input; switch S3 momentarily closes; switch S2 returns the amplifier input to the input signal; and switch S1 recloses, again connecting the oscillograph to the amplifier output.

It is necessary that the action of the three switches be precisely controlled in order to have the amplifier operate in accordance with the desired manner. These switches may be controlled in any desired manner. One satisfactory manner would be to employ mechanically operated switches, driven through a motor. However, the method illustrated employs magnetically operated switches, or relays. These relays are operated by an electronic timing circuit, which is shown schematically only in the lower part of Fig. 1. This circuit operates through the action of a series of trigger pairs. Pair 16, 17 are connected as a multivibrator, to generate pulses at intervals for setting the frequency of the rebalancing action. Each cycle, a negative pulse is applied to vacuum tube 18, which causes it to have its plate current cut off. This then causes plate current to be drawn through the tube 19, causing switch S1 to open, due to the current through its coil, 20. The pulse generated by the plate current of tube 19 is delayed through resistor-condenser combination 21, 22; and then applied to vacuum tube 23, cutting off its plate current, and thus causing plate current to flow through its mate, vacuum tube 24. This then causes current to flow through coil 25, closing switch S2 which, as mentioned before, grounds the grids of the amplifier. In a similar manner, the output pulse from 24 is delayed by resistor-condenser combination 26, 27, and applied to vacuum tube 28, cutting off its plate current and causing plate current to flow through vacuum tube 29. This then closes switch S3 by the current flowing through corresponding coil 30.

Trigger pair 28, 29 is connected, through the action of condenser 31, in such a manner that the plate current only continues to flow through vacuum tube 29 for a short interval. After this short interval, switch S3 is again released. A pulse is then produced by the plate current in vacuum tube 28. This pulse is delayed by resistor-condenser combination **32, 32*a*, and applied to vacuum tube 24, causing its plate current to be interrupted, and thus causing plate current to flow through corresponding mate 23. The pulse from the plate of 23 is delayed by resistor-condenser combination 33, 34, and applied to vacuum tube 19, causing its plate current to be interrupted, releasing switch S1, and causing plate current to flow in vacuum tube 18**.

Thus all vacuum tubes are now in their original condition, and ready to accept a timing pulse again from the timing pair 16, 17.

Experimentally, it has been found that a timing interval of five seconds is sufficiently rapid for even a very sensitive amplifier; and a much less frequent rebalancing is satisfactory with amplifiers of lesser sensitivity. The cycle of relay closing may be made to occupy approximately one-eighth of a second, through careful timing.

In place of having an automatic, periodic timing of the rebalancing, rebalancing may be done manually as desired, by injecting a pulse into the input of vacuum tube 18, through a switch. Another possibility is to inject such a pulse just before the start of any phenomenon which it is desired to record. For example, in recording action potentials from the nerve of animals, it is desired to record accurately what occurs after the application of an electrical stimulus to the nerve. Just before this stimulus is applied to the nerve, it may be arranged to apply a pulse to the input of the rebalancing circuit, thus insuring that the amplifier is balanced before the start of the action potential.

It will also be recognized that some of the switches which are shown as mechanical can be replaced by their electronic counterpart. Especially, switches S3 and S1 may be replaced by vacuum tubes for making the contact.

However, it is undesirable to so replace switch S2 since spontaneous, random fluctuations occurring in a vacuum tube if used for such purpose would largely nullify the value of the invention.

Details of one practical embodiment for the differential, push-pull amplifier circuit are shown in Figure 2. First stage amplifier tubes 1, 2 are followed by amplifiers 35, 36; and third stage 37, 38. The output of this third stage is coupled into the output tubes, cathode followers, 3, 4. The second and third stage amplifiers 35—36 and 37—38 constitute the translation means between the input stage (tubes 1, 2) and the output amplifying means (tubes 3, 4).

It will be noted that two power supplies are employed: one delivering a positive four hundred volts with respect to ground, and the second, a negative four hundred volts. A large cathode resistor 39, in the first stage is returned to the negative four hundred volt supply, and provides in-phase feedback to give true differential action in the input stage. The proper operating voltage is provided for the second stage by a second large cathode resistor 40. Voltage divider bridge 41, 42, 43, 44 provides proper operating bias for the third stage. Individual cathode resistors 45, 46 in the third stage are shunted by a variable resistor 47. When this latter resistor is set to zero resistance, this stage effectively has a single, common cathode resistor, giving no degeneration because the tubes are in push-pull, and thus maximum amplification. Correspondingly when 47 is at maximum resistance, the maximum degeneration occurs and the minimum amplification. Thus resistor 47 serves as an amplification control for the amplifier.

The inter-stage coupling between the third stage and the cathode follower is similar to that between the second and third stages, and returns the grid bias to the cathode followers to such a voltage that the two output cathode voltages are at ground potential when they are equal. Variable resistor 48 provides a variable voltage at the plate of vacuum tube 1, and serves as a manual balancing control.

The automatic rebalancing voltage is coupled from the cathode of vacuum tube 10 through resistor 49 into point 11, at the plate of vacuum tube 2.

The input through terminals 50, 51 are connected to the input switch S2, as shown in Figure 2. Switch S4, not included in the Fig. 1 circuit, serves to select the mode of amplifier operation. When in the "D.-C." position, the grid of 10 is connected through switch S3, as shown in Figure 2 to the amplifier output. This connection is for the automatic rebalancing D.-C. connection. When in the "A.-C." position, continuous feedback is employed through resistor 54, which obtains its feedback voltage through variable resistor 55 connected to the amplifier output. A purpose of 55 is the following: as resistor 47 is varied, the amplification of the loop is varied. Resistor 55 is then varied in an inverse manner, so that the net loop gain is constant, as the amplification control 47 is varied. To accomplish this, resistors 47 and 55 are mechanically coupled as indicated by the schematic linkage 56.

It will be seen that when the switch S4 is in the "A.-C." position, a continuous, but delayed, rebalancing of the amplifier occurs through the feedback path. This thus removes the D.-C. component from the output, substantially completely. It thus makes the amplifier into the equivalent of an A.-C. amplifier, whose time constant is adjustable by varying the time constant of the RC combination 54, 9. However, in an A.-C. amplifier of this type there are no inter-stage coupling condensers, and thus the possibility of amplifier blocking, due to the charging up of coupling condensers as a result of grid current, when large signals are applied, is eliminated.

It should be noted that point 11, to which the rebalancing voltage is applied, may be in various places in the amplifier; it could, for example, be connected to the suppressor grid of one of the tubes; to the cathode; or to the input grid of one of the later stages.

While the circuit has been illustrated for a push-pull amplifier, it may be employed with single-ended amplifiers as well, by eliminating one-half of the circuit.

Another mode of use of this amplifier is as follows: switch S2 is left permanently de-energized, but the amplifier is employed otherwise as above described for D.-C. amplification. Then when switch S3 rebalances the amplifier, any D.-C. component in the input is removed, as well as any amplifier unbalance. Thus in a sense the amplifier acts as an A.-C. amplifier, since the D.-C. component of the input is not maintained in the output. However, the amplifier acts as a D.-C. amplifier between rebalancing cycles, and thus no wave form distortion as is usually associated with an A.-C. amplifier will be produced.

In conclusion, it will be recognized that while the invention has been illustrated as applied to vacuum tube amplifiers, it is applicable also to amplifiers of other types, where the same principle of rebalancing may be employed. Moreover, while the illustrated embodiment of electronic amplifier is preferred, various changes in the construction and arrangement of component parts may be made without departing from the spirit and scope of the invention as defined in the appended claims.

I claim:

1. An amplifier responding to sustained input signal voltages and which includes rebalancing means for reducing the effect of drift therein, said amplifier comprising a first pair of grid-controlled amplifying tubes connected in differential push-pull arrangement and having an output circuit, two input terminals having signal voltages applied respectively thereto, first switching means including a pair of switching members operable in a first position thereof to connect respectively the input grids of said amplifying tubes to a fixed reference voltage point and operable in a second position thereof to connect said input terminals respectively to the input grids of said amplifying tubes, output amplifying means employing grid-controlled amplifying tubes and including output terminal means, translating means comprising intermediate push-pull amplifying stages connecting the output circuit of said first pair of amplifying tubes to said output amplifying means, a feed-back circuit from said output terminal means to an input circuit of one of said push-pull intermediate amplifying stages so that a voltage applied thereto will cause a proportional change in the signal output obtained from said output terminal means, and said feed-back voltage being in such sense as to reduce the steady-state amplification of the amplifier, second switching means in said feed-back circuit whereby said feedback circuit may be connected to and disconnected from said output terminal means, and storage means in said feed-back circuit retaining the feed-back voltage during the period when said feed-back circuit is disconnected from said output terminal means.

2. An amplifier as defined in claim 1 and which further includes timer means effecting sequential operation of said first and second switching means such that said first switching means is actuated to said first position, said second switching means is then actuated momentarily to momentarily connect said feed-back circuit to said output terminal means, and said first switching means is then actuated to said second position.

References Cited in the file of this patent

UNITED STATES PATENTS

| | | |
|---|---|---|
| 1,869,331 | Ballantine | July 26, 1932 |
| 2,375,283 | Cloud | May 8, 1945 |
| 2,538,488 | Volkers | Jan. 16, 1951 |
| 2,709,205 | Colls | May 24, 1955 |
| 2,716,162 | Pearlman | Aug. 23, 1955 |
| 2,734,949 | Berry | Feb. 14, 1956 |
| 2,747,030 | Nuckolls | May 22, 1956 |
| 2,807,677 | Caldecourt | Sept. 24, 1957 |

FOREIGN PATENTS

| | | |
|---|---|---|
| 620,140 | Great Britain | Mar. 21, 1949 |